United States Patent
Mandelli et al.

(10) Patent No.: US 12,520,245 B2
(45) Date of Patent: Jan. 6, 2026

(54) FULL RESOURCE ALLOCATION

(71) Applicant: Nokia Technologies Oy, Espoo (FI)

(72) Inventors: Silvio Mandelli, Tamm (DE); Alessandro Lieto, Milan (IT); Paolo Baracca, Stuttgart (DE); Thorsten Wild, Stuttgart (DE)

( * ) Notice: Subject to any disclaimer, the term of this patent is extended or adjusted under 35 U.S.C. 154(b) by 391 days.

(21) Appl. No.: 18/019,293

(22) PCT Filed: Aug. 6, 2020

(86) PCT No.: PCT/EP2020/072157
§ 371 (c)(1),
(2) Date: Feb. 2, 2023

(87) PCT Pub. No.: WO2022/028702
PCT Pub. Date: Feb. 10, 2022

(65) Prior Publication Data
US 2023/0284152 A1    Sep. 7, 2023

(51) Int. Cl.
*H04W 52/26* (2009.01)
*H04L 1/00* (2006.01)
*H04W 52/14* (2009.01)

(52) U.S. Cl.
CPC ......... *H04W 52/262* (2013.01); *H04L 1/0003* (2013.01); *H04L 1/0025* (2013.01); *H04W 52/146* (2013.01)

(58) Field of Classification Search
CPC ............... H04W 52/265; H04W 52/26; H04W 72/512; H04W 48/06; H04W 72/50
See application file for complete search history.

(56) References Cited

U.S. PATENT DOCUMENTS

| | | |
|---|---|---|
| 6,167,031 A | 12/2000 | Olofsson et al. |
| 2007/0104149 A1 | 5/2007 | Khan et al. |

(Continued)

FOREIGN PATENT DOCUMENTS

| | | | |
|---|---|---|---|
| CN | 101141157 A | * | 3/2008 |
| CN | 101594628 A | | 12/2009 |

(Continued)

OTHER PUBLICATIONS

LG Electronics "Discussion on Adaptation of MCS Depending on UE Speed" 3GPP TSG RAN WG1 Meeting #85; R1-164509 Ninjing, China, May 23-27, 2016.

(Continued)

*Primary Examiner* — Tu X Nguyen

(57) ABSTRACT

A method including: determining a respective first amount of resources each with a respective first power and a non-aggressive MCS such that a target value is guaranteed for a BLER of a transmission to a terminal under a channel estimate of a channel and a SINR estimate; and instructing a transmission device to perform the transmission using the non-aggressive MCS on the first amount of the resources each with the first power, wherein the transmission device may perform hypothetically the transmission using an aggressive MCS on a second amount of the resources each with a respective maximum available power such that the target value is guaranteed for the BLER under the assumed conditions; the first amount of the resources is larger than the second amount of the resources, the respective first power is less than the respective maximum available power.

14 Claims, 7 Drawing Sheets

(56) References Cited

U.S. PATENT DOCUMENTS

| | | | |
|---|---|---|---|
| 2020/0092861 | A1 | 3/2020 | Xu et al. |
| 2020/0137771 | A1 | 4/2020 | Nilsson et al. |
| 2020/0213067 | A1 | 7/2020 | Cirik et al. |

FOREIGN PATENT DOCUMENTS

| | | | |
|---|---|---|---|
| CN | 102415034 | A | 4/2012 |
| CN | 102598824 | A | 7/2012 |
| CN | 102647796 | A | 8/2012 |
| CN | 102687568 | A | 9/2012 |
| CN | 104365048 | A | 2/2015 |
| CN | 109155921 | A | 1/2019 |
| WO | WO-2018021853 | A1 | 2/2018 |

OTHER PUBLICATIONS

Yin, Guanghui et al. "User Scheduling and Resource Allocation in a Mixed Business Scenarios of eMBB and URLLC" Sep. 19, 2019.

Fan, Jiancun et al. "Adaptive Block-Level Resource Allocation in OFDMA Networks" Sep. 29, 2011.

Berardinelli, G. et al., "6G subnetworks for Life-Critical Communication", 2nd 6G Wireless Summit , 2020.

Adeogun, R., et al., "Toward 6G in-X Subnetworks With Sub-Millisecond Communication Cycles and Extreme Reliability", in IEEE Access, vol. 8, pp. 110172-110188, 2020, doi:10.1109/ACCESS. 2020.3001625.

Park, S. et al., "An evaluation methodology for spectrum usage in LTE-A networks: Traffic volume and resource utilizaation perspective," IEEE Access, 7, 67863-67873.

Pocovi, G., et al., "Joint link adaptation and scheduling for 5G ultra-reliable low-latency communications,", IEEE Access, vol. 6, pp. 28 912-28 922, 2018.

Brighente, A., et al., "Interference distribution prediction for link adaptation in ultra-reliable low-latency communications", in Proc. IEEE Vehicular Technology Conference (VTC-Spring), Antwerp (Belgium), May 2020.

Polyanskiy, Y., et al., "Channel Coding Rate in the Finite Blocklength Regime," in IEEE Transactions on Information Theory, vol. 56, No. 5, pp. 2307-2359, May 2010, doi: 10.1109/TIT.2010. 2043769.

Mandelli, S., et al., "Satisfying Network Slicing Constrains via 5G MAC Scheduling", IEEE Infocom, 2019 IEEE Infocom 2019 IEEE Conference on Computer Communications, Paris, Frances, 2019, pp. 2332-2340, doi: 10.1109/INFOCOM.2019.8737604.

Wan, L., et al., "A fading-insensitive performance metric for a unified link quality model," In: Proc. IEEE WCNC 2006, pp. 2110-2114.

3GPP TR 38.802 V14.2.0, "3rd Generation Partnership Project; Technical Specification Group Radio Access Network; Study on New Radio Access Technology Physical Layer Aspects (Release 14)", Sep. 2017.

3GPP TS 38.212 V16.3.0, "3rd Generation Partnership Project; Technical Specification Group Radio Access Network; NR; Multiplexing and channel coding (Release 16)", Sep. 2020.

3GPP TS 38.214 V19.0.0, "3rd Generation Partnership Project; Technical Specification Group Radio Access Network; NR; Physical layer procedures for data (Release 19)", Jun. 2025.

3GPP TR 36.872 V12.1.0, "3rd Generation Partnership Project; Technical Specification Group Radio Access Network; Small cell enhancements for E-UTRA and E-UTRAN Physical layer aspects (Release 12)" Dec. 2013.

3GPP TR 36.873 V12.7.0, "3rd Generation Partnership Project; Technical Specification Group Radio Access Network; Study on 3D channel model for LTE (Release 12)", Dec. 2017.

Shannon, Claude E. "A Mathematical Theory of Communication", Bell System Technical Journal 27.3,1948, pp. 379-423.

Klein, S. and S. Mandelli, "Link adaptation in telecommunication systems," (GB1913581.3),Nokia Solutions and Networks Oy, Sep. 20, 2019, 35 pages.

\* cited by examiner

FULL RESOURCE ALLOCATION

CROSS REFERENCE TO RELATED APPLICATION

This patent application is a U.S. National Stage application of International Patent Application Number PCT/EP2020/072157 filed Aug. 6, 2020, which is hereby incorporated by reference in its entirety.

FIELD OF THE INVENTION

The present disclosure relates to link adaptation in a wireless communication network.

Abbreviations

3GPP 3rd Generation Partnership Project
3G/4G/5G 3rd/4th/5th Generation
ALA Aggressive LA
BLER BLock Error Rate
BS Base station
CQI Channel quality indicator
CU Central Unit
DCI Downlink Control Information
DRB Data Radio Bearer
DU Distributed Unit
eNB evolved NodeB (4G base station)
FRA Full Resource Allocation
FTP3 File Transfer Protocol
GBR Guaranteed Bit Rate
gNB 5G base station
IIoT Industrial Internet of Things
L2 Layer 2 (of OSI model; =MAC)
LA Link Adaptation
LTE Long term evolution
MAC Medium Access Control
MBB Mobile broadband
MCS Modulation and Coding Scheme
MIMO Multiple-input multiple-output
MTC Machine-Type Communication
NR New radio
OLLA Outer Loop Link Adaptation
PF Proportional Fair (Scheduling)
PSD Power Spectral Density
PRB Physical resource block
QoS Quality of Service
RAT Radio Access Technology
RU Radio Unit
SINR Signal to interference plus noise ratio
SMS Scheduling Metrics for Slicing
SPS Semi Persistent Scheduling
TTI Time Transmission Interval
UE User Equipment
UL Uplink
URLLC Ultra-Reliable Low-Latency Communications
V2X Vehicular to everything

BACKGROUND OF THE INVENTION

In 3GPP networks, like LTE and NR, a base station (more particularly: the packet scheduler thereof) performs scheduling decisions every TTI (e.g. every 1 ms). The packet scheduler allocates one or more resource blocks to each transmission to be performed in the next TTI. A resource block is a frequency band of a given bandwidth within a time slot (a combination of frequency band and time slot). Typically, the bandwidths of the resource blocks are the same, and/or the durations of the resource blocks (time slots) are the same. The resource blocks form a grid in the frequency vs. time plane. Hereinafter, the resource blocks are denoted as "resources".

In mobile systems, the BS collects some feedback from the UE about the SINR at that UE by CQI. The CQI represents a quantized version of the SINR that is experienced by the UE in a certain time instant. Based on that and on some other parameters, the BS decides the MCS of the transmission. The L2 Packet Scheduler allocates resources to a transmission for the TIE (i.e., to the UE (downlink) or from the UE (uplink)) according to the decided MCS.

In the present application, the term "transmission" comprises the data to be transmitted for the UE. I.e., two transmissions are considered to be the same if the same data are transmitted in the same TTI with a same guaranteed BLER, irrespective of the resources used for the transmission in the TTI and irrespective of the applied MCS.

The scheduler (MAC scheduler) may aggregate traffic coming from different flows or for (from) different UEs, or from different DRB for transmission in the next TTI. The aggregation choice among these 3 options depends on the specific MAC scheduler implementation. From a generic MAC formulation, these options can be seen as the atomic schedulable entity in the MAC scheduler. Hereinafter, the expression "flows/UEs/DRBs" expresses that the data to be transmitted may come from different flows or for different UEs or from different DRBs, depending on MAC scheduler implementation.

[U.S. Pat. No. 6,167,031] describes a basic method where the MCS is selected based on mean and variance of the SINR. Although this scheme can be seen as a sort of precursor of all the LA schemes that try to exploit the distribution of the interference, it does not work with URLLC, as predicting the SINR based only on a computation of the mean and variance is definitely not enough.

[US2007104149] proposes a method in a more specific way when compared to [U.S. Pat. No. 6,167,031] to select the MCS in a link-adaptation algorithm based on the SINR variance. The drawback is, as explained for the previous patent, that just using the variance is not enough for the extreme reliability requirements of URLLC.

Starting from these basic ideas, more advanced schemes have been developed in the last few years. For instance, [KM19] proposes a method to estimate the distribution of the interference power experienced by UEs thanks to the CQI feedback from that UE. More recently, [BMP20] extends this method by exploiting time correlation of interference with periodic traffic and using kernel-based density estimators to predict the SINR.

A common feature of these solutions is that they are reactive schemes that try to better predict the SINR.

[PPM18, Sect. III-C] proposes to allocate all PRBs in a TTI to URLLC traffic, with the purpose of transmitting with a more conservative MCS, thus increasing reliability. The objective is to have a more robust URLLC transmission in the current TTI. They do not control the interference of the system.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: determine, for at least one of plural terminals, a respective first amount of resources each with a respective first power and a respective non-aggressive modulation and coding scheme such that a respective target value is guaranteed for a respective block error rate of a transmission from a base station to the respective terminal under a respective assumed channel estimate of a channel from the base station to the respective terminal and a respective assumed signal to interference and noise ratio estimate on the channel; and instruct a transmission device to perform, to the at least one of the plural terminals, the transmission to the respective terminal using the respective non-aggressive modulation and coding scheme on the respective first amount of the resources each with the respective first power, wherein for each of the plural terminals, the transmission device may perform hypothetically the transmission to the respective terminal using a respective aggressive modulation and coding scheme on a respective second amount of the resources each with a respective maximum available power such that the respective target value is guaranteed for the respective block error rate of the transmission to the respective terminal under the respective assumed channel estimate and the respective assumed signal to interference and noise ratio estimate; for the at least one of the plural terminals, the respective first amount of the resources is larger than the respective second amount of the resources, for the at least one of the plural terminals, for at least one of the resources of the respective first amount of the resources, the respective first power is less than the respective maximum available power of the respective resource.

According to a second aspect of the invention, there is provided an apparatus comprising: one or more processors, and memory storing instructions that, when executed by the one or more processors, cause the apparatus to: determine, for at least one of plural terminals, a respective first amount of resources each with a respective first power and a respective non-aggressive modulation and coding scheme such that a respective target value is guaranteed for a respective block error rate of a transmission from the respective terminal to a base station under a respective assumed channel estimate of a channel from the respective terminal to the base station and a respective assumed signal to interference and noise ratio estimate on the channel; and instruct the at least one terminal to perform the transmission to the base station using the respective non-aggressive modulation and coding scheme on the respective first amount of the resources each with the respective first power, wherein for each of the plural terminals, the respective terminal may perform hypothetically the transmission using a respective aggressive modulation and coding scheme on a respective second amount of the resources each with a respective maximum available power such that the respective target value is guaranteed for the respective block error rate of the transmission from the respective terminal under the respective assumed channel estimate and the respective assumed signal to interference and noise ratio estimate; for the at least one of the plural terminals, the respective first amount of the resources is larger than the respective second amount of the resources, for the at least one of the plural terminals, for at least one of the resources of the respective first amount of the resources, the respective first power is less than the respective maximum available power of the respective resource.

According to a third aspect of the invention, there is provided an apparatus comprising: one or more processors, and memory storing instructions that, when executed by the one or more processors, cause the apparatus to: monitor, for each of plural transmission time intervals, if a terminal receives a respective indication of power for a respective resource from a base station, wherein the respective indication is related to a respective transmission from the terminal to the base station on the respective resource at the respective transmission time interval; instruct, for each of the plural transmission time intervals, a transmission device of the terminal to perform the respective transmission to the base station on the respective resource with the respective indicated power if the terminal receives the indication for each of the plural transmission time intervals.

According to a fourth aspect of the invention, there is provided a method comprising: determining, for at least one of plural terminals, a respective first amount of resources each with a respective first power and a respective non-aggressive modulation and coding scheme such that a respective target value is guaranteed for a respective block error rate of a transmission from a base station to the respective terminal under a respective assumed channel estimate of a channel from the base station to the respective terminal and a respective assumed signal to interference and noise ratio estimate on the channel; and instructing a transmission device to perform, to the at least one of the plural terminals, the transmission to the respective terminal using the respective non-aggressive modulation and coding scheme on the respective first amount of the resources each with the respective first power, wherein for each of the plural terminals, the transmission device may perform hypothetically the transmission to the respective terminal using a respective aggressive modulation and coding scheme on a respective second amount of the resources each with a respective maximum available power such that the respective target value is guaranteed for the respective block error rate of the transmission to the respective terminal under the respective assumed channel estimate and the respective assumed signal to interference and noise ratio estimate; for the at least one of the plural terminals, the respective first amount of the resources is larger than the respective second amount of the resources, for the at least one of the plural terminals, for at least one of the resources of the respective first amount of the resources, the respective first power is less than the respective maximum available power of the respective resource.

According to a fifth aspect of the invention, there is provided a method comprising: determining, for at least one of plural terminals, a respective first amount of resources each with a respective first power and a respective non-aggressive modulation and coding scheme such that a respective target value is guaranteed for a respective block error rate of a transmission from the respective terminal to a base station under a respective assumed channel estimate of a channel from the respective terminal to the base station and a respective assumed signal to interference and noise ratio estimate on the channel; and instructing the at least one terminal to perform the transmission to the base station using the respective non-aggressive modulation and coding scheme on the respective first amount of the resources each with the respective first power, wherein for each of the plural terminals, the respective terminal may perform hypothetically the transmission using a respective aggressive modulation and coding scheme on a respective second amount of the resources each with a respective maximum available power such that the respective target value is guaranteed for the respective block error rate of the transmission from the respective terminal under the respective assumed channel estimate and the respective assumed signal to interference and noise ratio estimate; for the at least one of the plural terminals, the respective first amount of the resources is larger than the respective second amount of the resources, for the at least one of the plural terminals, for at least one of the resources of the respective first amount of the resources, the respective first power is less than the respective maximum available power of the respective resource.

According to a sixth aspect of the invention, there is provided a method comprising: monitoring, for each of plural transmission time intervals, if a terminal receives a respective indication of power for a respective resource from a base station, wherein the respective indication is related to a respective transmission from the terminal to the base station on the respective resource at the respective transmission time interval; instructing, for each of the plural transmission time intervals, a transmission device of the terminal to perform the respective transmission to the base station on the respective resource with the respective indicated power if the terminal receives the indication for each of the plural transmission time intervals.

Each of the methods of the fourth, fifth, and sixth aspects may be a method of resource allocation.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
Overall system achievable throughput is never reduced compared to the prior art;
Overall power spectral density is never increased compared to the prior art;
Overall time-averaged transmit power is not increased over the prior art;
As soon as the system is not fully loaded:
  Less interference because of a lower transmit power and power spectral density
  Pursuing full resource allocation stabilizes interference in time/frequency, resulting in easier and more reliable Link Adaptation for high reliability services
  The two points above produce higher achievable throughput even in fully saturated cells, if the neighbouring cells are not fully loaded
  The overall delays of typical FTP1, FTP3 and constant bit rate (GBR) traffic profiles are not impaired. Rather, they experience a slight reduction due to the lower interference experienced
  With the proposed procedure to compute $M'_i$, the complexity increase is zero at the scheduler and negligible in the resource allocation phase.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1:
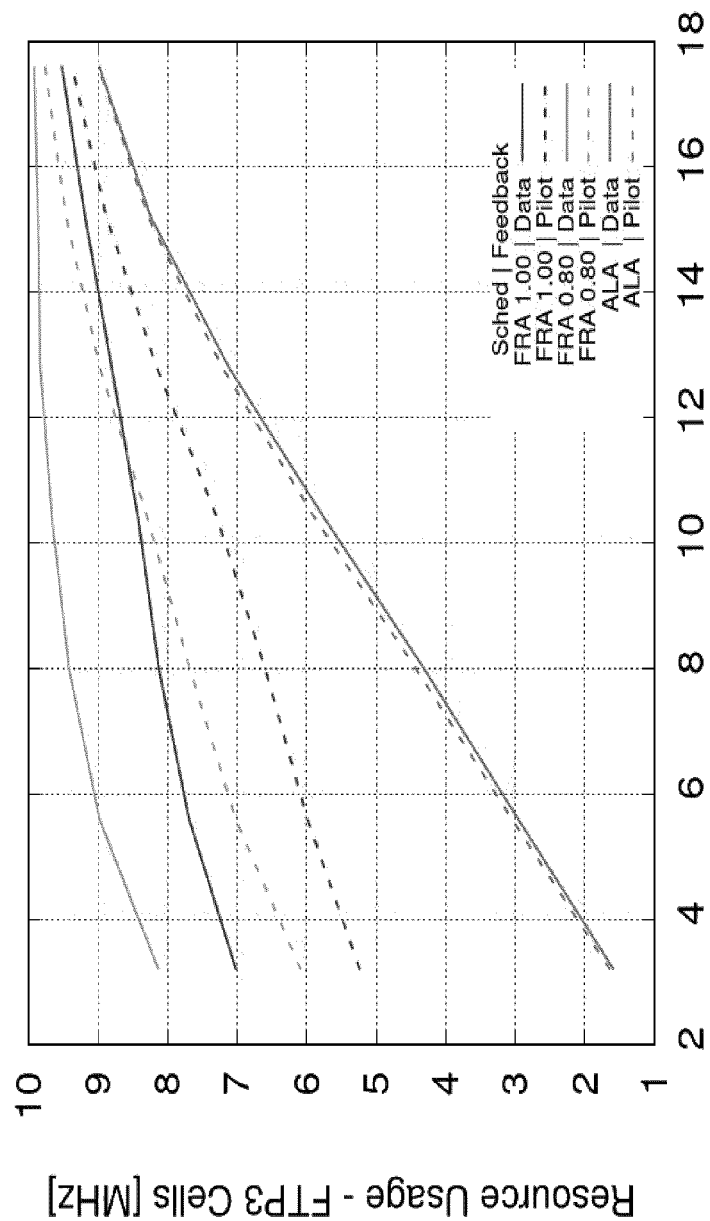
FIG. 1 shows average resource usage according to a simulation of an example embodiment of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

With the ongoing densification of wireless access points in unlicensed and licensed bands, e.g. the future trend of 6G subnetworks [ADEOGUN2020], interference will increasingly dominate RAT performance, even more that it is already doing nowadays in NR systems.

Therefore, a main challenge for the reliability of future wireless systems is the control and the stability of the intra-cell and inter-cell interference. Traditionally, such systems have always pushed to achieve the highest possible geometric mean of throughput via proportional fair scheduling, and applying a LA scheme that tries to optimize the single transmission's spectral efficiency, with a fixed desired target BLER as a boundary condition. Hereinafter, such a scheme is denoted as ALA.

Wireless networks resources are often under-utilized, even in dense urban environments, like Seoul [PAKJ2019]. Some example embodiments of the invention exploit this insight. Namely, some example embodiments of the invention provide a novel L2 solution involving a properly designed Link Adaptation (LA) and radio resource allocation scheme. That is, some example embodiments of the invention leverage the under-utilization of the radio resources, to increase overall system performance and reduce overall transmitted and interference power. Such example embodiments are particularly useful for highly interference-limited systems, but not restricted thereto.

Some example embodiments of the invention control interference in the system in a more proactive way than according to the prior art. Namely, some example embodiments of the invention reduce the rate of active flows/UEs/ DRBs during the considered TTI based on a time-smoothed ratio between the amount of resource needed to serve all connected flows/UEs/DRBs and the total available resources (time-frequency resources).

To the best of our knowledge, in L2 procedures of wireless systems, it was never considered to leverage under-utilization of radio resources to reduce transmissions' rates—thus reducing spectral efficiency and increasing resource utilization—with the advantage of allowing a transmit power reduction. In some example embodiments, the transmit power reduction may be even drastic. Due to the transmit power reduction, interference is reduced.

As a consequence of the reduced interference in neighbour cells, these cells may in turn reduce the transmit powers (regardless of the link adaptation algorithm (e.g. ALA or FRA) applied in the neighbour cell. Consequently, the power in the present cell may be reduced even more. I.e., some example embodiments of the invention may generate a positive feedback loop to reduce transmit power in the system.

Some example embodiments of the invention apply a Link Adaptation (LA) algorithm for Radio Access Technologies (RAT) systems, called hereafter Full Resource Allocation (FRA). In contrast to the prior art Aggressive LA (ALA) mechanisms that aim to select the most aggressive MCS that matches a target BLER, LA according to some example embodiments of the invention may work as follows:

Get Channel, interference and noise power estimates. For example, conventionally known mechanisms (potentially including OLLA corrections) may be applied.

Compute the ALA MCS for every UE i∈I, i.e. $M_i$ with the maximum possible Transmit power (as usual), i.e. constant PSD in DL, and power allowed by the Power Control mechanisms in UL Track the time-smoothed ratio $\beta(\tau)$ between the amount of resources needed to serve connected UEs/DRBs (i.e., to perform the transmissions requested for the next one or more TTIs) and the total available resources if ALA were hypothetically applied Instead of using MCS $M_i$ for transmissions involving user i, according to some example embodiments of the invention:

Select another MCS $M'_i$ (denoted FRA MCS), whose rate is lower than or equal to $M_i$ (a proposal to do this in a fair manner can be found in the detailed description of theory and simulations below), such that the expected resource utilization is nearer to full resource utilization, if every user i is allocated $M'_i$. For example, the expected resource utilization may be as close as possible to full resource utilization (utilizing the maximum available resources).

Reduce transmit power such that the expected BLER is the target desired BLER.

Allocate resources as usual with the selected FRA MCS with the desired scheduling policy.

In some example embodiments, ALA MCS is not explicitly computed but the LA module calculates immediately a FRA MCS.

In some example embodiments, the MCS downscaling procedure may be fair because it may be related to allocation a number of resources only but not to scheduling of the resources. Scheduling may be performed independently from the allocation of the number of the resources. In such example embodiments, it is preferably assumed that all the resources (resource blocks) of the maximum available resources are equivalent to each other.

In some example embodiments, if one or more of the transmissions are delay critical (such as URLLC), ALA may be applied to the delay critical transmissions, and FRA LA may be applied to the remaining transmissions based on the remaining resources.

In some example embodiments, the LA algorithm may consider not only the next TTI but plural next TTIs. This is possible because the MAC scheduler is aware of the set of the active flows/UEs/DRBs in the system, and for each of those typically an estimate of the SINR, the buffer state and the desired first transmission target BLER is known. For a delay critical flow, the LA algorithm may calculate the minimum number of TTIs required to transmit the delay-critical flow (i.e. using ALA). The actually used number of resources may be determined using a scaling factor $\beta(=A/B$ with A: number of resources needed according to ALA, B: number of available resources, which corresponds to the bandwidth if the duration of a TTI is fixed) taking into account the number of required TTIs for the transmission of the delay-critical flow, as described in the detailed description of theory and simulations further below (see equation (18)). I.e., the number of resources will be increased compared to ALA by a factor $1/\beta$.

The FRA algorithm may provide a factor by which the transmit power of a resource (transmit power spectral density) is reduced compared to an ALA algorithm.

FRA may be applied to downlink only, or to uplink only, or to both downlink and uplink. In uplink, the base station provides grants to the UE. If FRA is applied to uplink, the base station informs the terminal on the power to be applied on the allocated resource. Such information may be provided for every TTI either together with the other grant information (resource allocation, MCS, etc.), or in a separate message to the terminal.

Figure 7:
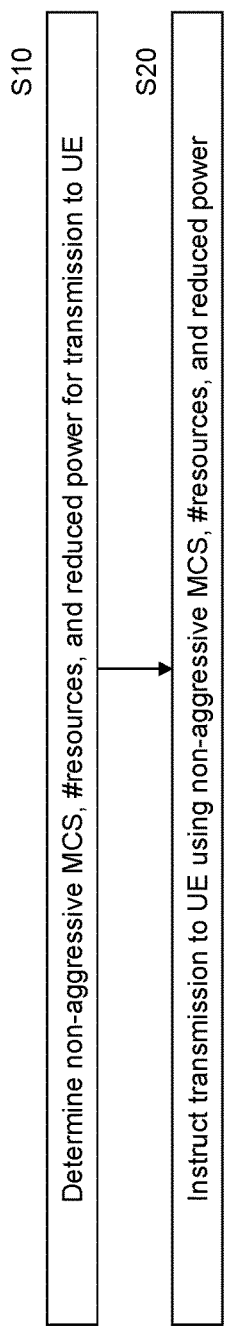
FIG. 7 shows a method according to an example embodiment of the invention.
Figure 6:
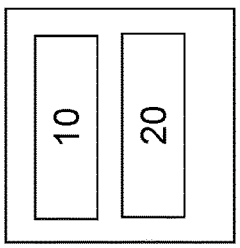
FIG. 6 shows an apparatus according to an example embodiment of the invention.

FIG. 6 shows an apparatus according to an example embodiment of the invention. The apparatus may be a base station (e.g. gNB or eNB), or an element thereof such as a scheduler, in particular a downlink scheduler. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for determining 10 and means for instructing 20. The means for determining 10 and means for instructing 20 may be a determining means and instructing means, respectively. The means for determining 10 and means for instructing 20 may be a determiner and instructor, respectively. The means for determining 10 and means for instructing 20 may be a determining processor and instructing processor, respectively.

The means for determining 10 determines, for at least one of plural terminals, a respective first amount of resources each with a respective first power and a respective non-aggressive modulation and coding scheme (S10). The first amount of resources with the respective first power (i.e., the transmission power on each resource of the first amount of the resources) and the respective non-aggressive modulation and coding scheme are determined such that a respective target value is guaranteed for a respective block error rate of a transmission from a base station to the respective terminal under a respective assumed channel estimate of a channel from the base station to the respective terminal and a respective assumed signal to interference and noise ratio estimate on the channel. The first power may be determined relative to the maximum available power on the resource, or it may be determined as an absolute value.

The means for instructing 20 instructs a transmission device to perform, to the at least one of the plural terminals, the transmission to the respective terminal using the respective non-aggressive modulation and coding scheme on the respective first amount of the resources each with the respective first power (S20).

Hypothetically, for each of the plural terminals, the transmission device may perform the transmission to the respective terminal using a respective aggressive modulation and coding scheme on a respective second amount of the resources each with a respective maximum available power such that the respective target value is guaranteed for the respective block error rate of the transmission to the respective terminal under the respective assumed channel estimate and the respective assumed signal to interference and noise ratio estimate.

For the at least one of the plural terminals, the respective first amount of the resources (on which the transmission is actually instructed) is larger than the respective second amount of the resources. For the at least one of the plural terminals, for at least one of the resources of the respective first amount of the resources, the respective first power is less than the respective maximum available power of the respective resource.

Figure 9:
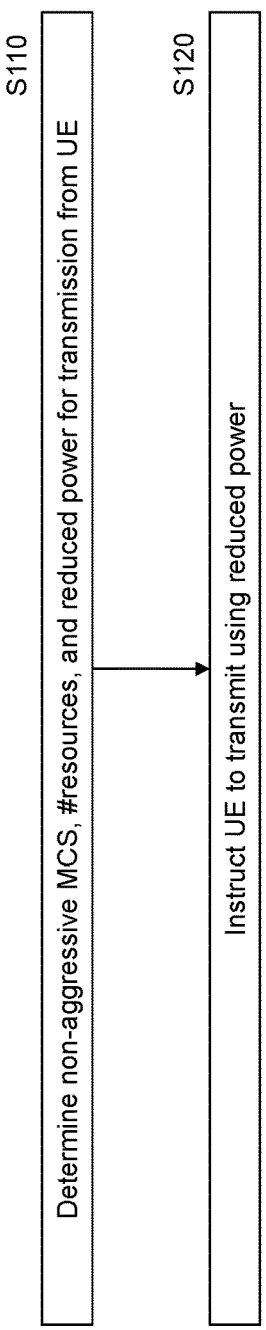
FIG. 9 shows a method according to an example embodiment of the invention.
Figure 8:
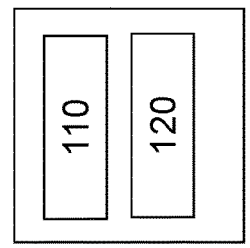
FIG. 8 shows an apparatus according to an example embodiment of the invention.

FIG. 8 shows an apparatus according to an example embodiment of the invention. The apparatus may be a base station (e.g. gNB or eNB), or an element thereof such as a scheduler, in particular an uplink scheduler. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for determining 110 and means for instructing 120. The means for determining 110 and means for instructing 120 may be a determining means and instructing means, respectively. The means for determining 110 and means for instructing 120 may be a determiner and instructor, respectively. The means for determining 110 and means for instructing 120 may be a determining processor and instructing processor, respectively.

The means for determining 110 determines, for at least one of plural terminals, a respective first amount of resources each with a respective first power and a respective non-aggressive modulation and coding scheme (S110). The first amount of resources with the respective first power (i.e., the transmission power on each resource of the first amount of the resources) and the respective non-aggressive modulation and coding scheme are determined such that a respective target value is guaranteed for a respective block error rate of a transmission from the respective terminal to a base station under a respective assumed channel estimate of a channel from the respective terminal to the base station and a respective assumed signal to interference and noise ratio estimate on the channel.

The means for instructing 120 instructs the at least one terminal to perform the transmission to the base station using the respective non-aggressive modulation and coding scheme on the respective first amount of the resources each with the respective first power (S120).

Hypothetically, for each of the plural terminals, the respective terminal may perform the transmission using a respective aggressive modulation and coding scheme on a respective second amount of the resources each with a respective maximum available power such that the respective target value is guaranteed for the respective block error rate of the transmission from the respective terminal achieves under the respective assumed channel estimate and the respective assumed signal to interference and noise ratio estimate.

For the at least one of the plural terminals, the respective first amount of the resources is larger than the respective second amount of the resources. For the at least one of the plural terminals, for at least one of the resources of the respective first amount of the resources, the respective first power is less than the respective maximum available power of the respective resource.

Figure 11:
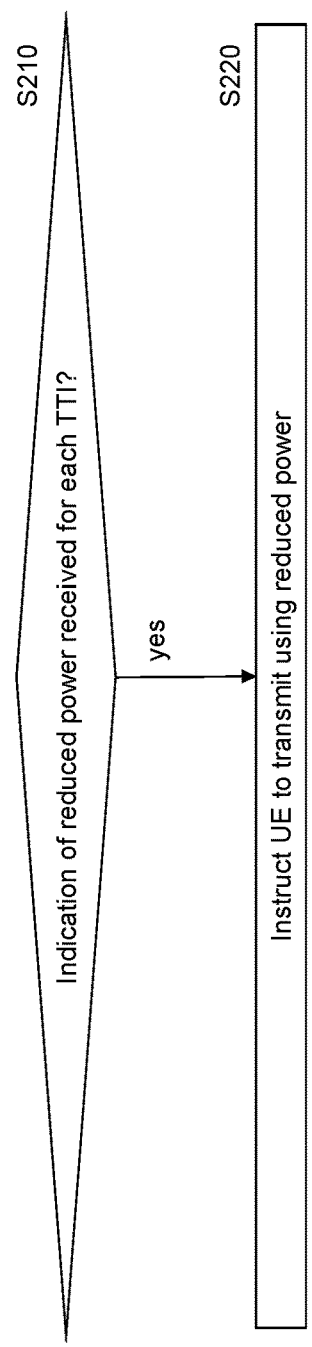
FIG. 11 shows a method according to an example embodiment of the invention.
Figure 10:
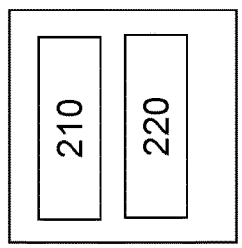
FIG. 10 shows an apparatus according to an example embodiment of the invention.

FIG. 10 shows an apparatus according to an example embodiment of the invention. The apparatus may be a terminal (e.g. UE, MTC device), or an element thereof such as a controller. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 210 and means for instructing 220. The means for monitoring 210 and means for instructing 220 may be a monitoring means and instructing means, respectively. The means for monitoring 210 and means for instructing 220 may be a monitor and instructor, respectively. The means for monitoring 210 and means for instructing 220 may be a monitoring processor and instructing processor, respectively.

The means for monitoring 210 monitors, for each of plural transmission time intervals, if a terminal receives a respective indication of power for a respective resource from a base station (S210). For each of the plural transmission time intervals, the respective indication is related to a respective transmission from the terminal to the base station on the respective resource at the respective transmission time interval. The plural transmission time intervals may be consecutive.

If the terminal receives the indication for each of the plural transmission time intervals (S210=yes), the means for instructing 220 instructs a transmission device of the terminal to perform the respective transmission to the base station on the resource with the indicated power (S220).

Figure 12:
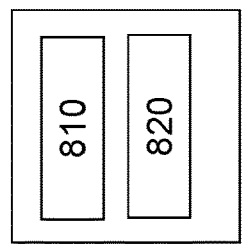
FIG. 12 shows an apparatus according to an example embodiment of the invention.

FIG. 12 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 7, 9 and 11 and related description.

Some example embodiments are explained with respect to a 5G network. However, the invention is not limited to 5G. It may be used in 3G or 4G networks and 3GPP networks of future generations where link adaptation is employed. It is not even limited to 3GPP networks. It may be used in other wireless communication networks (e.g. WiFi networks).

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

A terminal (UE) may be e.g. a mobile phone, a smartphone, a MTC device, a laptop etc. A gNB is an example of a base station to which some example embodiments of the invention are applicable. Another example is a eNB.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a base station (such as a gNB or eNB) or a component thereof (such as a link adaptation module), an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a terminal such as a UE, a MTC device etc., or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

A method comprising: determining a respective first amount of resources each with a respective first power and a non-aggressive MCS such that a target value is guaranteed for a BLER of a transmission to a terminal under a channel estimate of a channel and a SINR estimate; and instructing a transmission device to perform the transmission using the non-aggressive MCS on the first amount of the resources each with the first power, wherein the transmission device may perform hypothetically the transmission using an aggressive MCS on a second amount of the resources each with a respective maximum available power such that the target value is guaranteed for the BLER under the assumed conditions; the first amount of the resources is larger than the second amount of the resources, the respective first power is less than the respective maximum available power.

The above mentioned benefits of some example embodiments of the invention were proven both theoretically and by means of system level simulations with a 3GPP calibrated software. The details are outlined hereinafter in the "Details of theory and simulations of some example embodiments of the invention".

Details of Theory and Simulations of Some Example Embodiments of the Invention 1 5G: To the Edge of Spectral Efficiency In general, the whole idea of prior art L2 scheduling is to find a way for pushing the limit of the sum of a concave function of the user throughput $$U(r) = \sum_{i \in I} U(r_i) \quad (1)$$

where $i \in I$ is a generic user among the user set I served by the scheduler, $r_i$ its temporally smoothed throughput and r is the real-valued vector of all user throughputs with $r \in \mathbb{R}^{1 \times I}$. Typically, proportional fair (PF) scheduling can be adopted, i.e. $U(r_i)=\log(r_i)$, making the scheduling decision based on the following per-user metrics $$M_i = \frac{a_{m_i}}{r_i} \quad (2)$$

where $\alpha_{m_i}$ is the instantaneous achievable throughput by the i-th user, that is using the Modulation and Coding Scheme (MCS) $m_i$, if i-th user is scheduled. Even if our analysis is performed with PF scheduling, the theoretical analysis and simulation behavior generalize also for other scheduling metrics, like more complex QoS-aware schedulers in the literature [Mandelli et al., 2019]. While avoid delay in our theoretical considerations (addressing it by means of simulations), reliability cannot be neglected. Since the existing aggressive approach is to squeeze out the most in terms of [bit/s/Hz] of the radio resources, $\alpha_i$ was determined by a Link Adaptation (LA) process that was operating with the amount of bandwidth available B, the fixed maximum allowed amount of transmit power $P_T$ or transmit power spectral density $D_T=P_T/B$, an estimate of the transmission SINR $\hat{\gamma}=D_T \cdot \hat{\alpha}$, where the term $\hat{\alpha}$ incorporates the estimated channel gain (squared) divided by the noise plus interference power term, the buffer/packet/transport block dimension T, an available ordered set M of MCS, where each $m \in M$ has a BLock Error Rate (BLER) curve that is function of $\hat{\gamma}$, i.e. $\epsilon_m(\gamma,T)$, sorted in ascending order of the corresponding achievable rates $\alpha_m$, an initial transmission BLER $\bar{\epsilon}$.

Note that at the moment we will consider fixed $D_T$, since for DL this is the case. We will do some fixed $P_T$ considerations later on. The idea of the existing LA algorithms, hereafter Aggressive LA (ALA), is to select the MCS m' to minimize the resource consumption $$m' = \underset{m \in M}{\operatorname{argmin}}\left[\frac{T}{a_m}\right] \quad (3)$$

$$\text{s.t. } \epsilon_m(\gamma, T) \le \bar{\epsilon} \quad (4)$$

In reality the constraint (4) can be satisfied as average of multiple LA decisions (typical of OLLA and more advanced mechanisms), but this is not relevant for the moment. Since M is sorted, for simplicity, one can rewrite the problem (3)-(4) as follows $$m' = \sup_m M_{\epsilon,\gamma,T} = \sup_m \{m \in M : \epsilon_m(\gamma, T) \leq \bar{\epsilon}\} \quad (5)$$

and the sorting rule within the acceptable MCS set $M_{\epsilon,\gamma,T}$ is still the same used for M. The thirst for resources results in an optimization outcome which just matches the target BLER, transmitting at full available "power" and with the highest possible rate.

2 Full Resource Allocation (FRA) Scheduling

This section will describe the new proposed L2 paradigm and its theoretical properties. The whole idea is to change how L2 operations are sorted and the optimization criterion of LA. In a full buffer traffic world, it's safe to push for the highest "fair" throughput possible in the system, that can be achieved with all developed prior art techniques quickly resumed in Section 1. However, it is well known that wireless networks typically do not operate at maximum capacity, making their resources usage to be lower than 100%. Accordingly, we can finally capture the remaining piece needed for FRA in the assumption below Assumption 1 An estimate of the offered throughput at the currently scheduled TTI is known by the L2.

Note that Assumption 1 is clearly satisfied also in the previous L2 concept. We will see later how we can relax it with Assumption 2, allowing FRA concept to generalize to time-smoothed estimates and multiple TTIs, achieving its full potential.

Starting from the case of Assumption 1, like in the old L2 problem, at each TTI we have some traffic $T_i$ in each user $i \in I$ buffer to be allocated. After Time-Domain (TD) scheduling performed with the old ALA, i.e. computing $\alpha_{m_i}, \forall i \in I$, we select the users in the set I' that will be served in the TTI. If all the traffic cannot be served, i.e. $\Sigma_{i \in I'} T_i / a_{m_i} > B$, then $I' \subseteq I$ and we would have a "congested" TTI and we can fall back to the prior-art approaches that maximize spectral efficiency. If all the traffic can be served, i.e. $\Sigma_{i \in I'} T_i / a_{m_i} = A \leq B$, we have that I'=I and FRA could kick in. The idea is to exploit all the left-up B−A resources, without giving up in reliability and allowing to reduce both $D_T$ and $P_T$. One could simply compute the ratio β=A/B, scale down the rate of each user accordingly, and reduce the transmit power until the BLER target is achieved again. Expanding a bit the formulae for a generic $i \in I$, we have that the new selected MCS m'$_i$ is such that $\alpha_{m'_i} \approx \alpha_{m_i} \beta \leq \alpha_{m_i}$. One can be always conservative and select the MCS with rate such that $\alpha_{m_i} \beta \leq \alpha_{m'_i} \leq \alpha_{m_i}$, but better resource exploitation can be enforced with simple heuristics, see Subsection 4.1. Then, one can use the estimated channel versus interference plus noise ratio $\alpha_i$ to compute the reduced transmit power by solving the following equality $$\epsilon_{m'_i}(D'_{T,i} \cdot \alpha, T_i) = \bar{\epsilon}_i \quad (6)$$

Note that this step is also different compared to prior art implementations, where the transmit power was never reduced to match the target BLER.

It's clear from (6) that the emitted power spectral density is not increased beyond its allowed maximum, i.e. $D'_{T,i} \leq D_{T,i}$, where the strict inequality holds if m'$_i$<m$_i$. In what follows, we will prove that also the overall transmit power is reduced by using the Shannon Formula [Shannon, 1948]. Note that a similar derivation can be done by exploiting the Finite Blocklength Theory [Polyanskiy et al., 2010] and the FRA power reduction is clearly higher in this case, due to an increased number of channel uses, leading to an higher maximal coding rate with the proposed approach.

Starting from the well known equation, where the channel rate has been substituted with the transmission rate, we would like to derive the needed power spectral density to respect the Shannon theorem $$\frac{T_i}{B_i} = a_{m_i} = \log_2(1 + \gamma_i) = \log_2(1 + D_{T,i}\alpha_i) \quad (7)$$

$$\frac{T_i}{B'_i} = a_{m'_i} = \log_2(1 + \gamma'_i) = \log_2(1 + D'_{T,i}\alpha_i) \quad (8)$$

Defining $\alpha_{m'_i}/a_{m_i} = \tilde{\beta} \approx \beta$, we have that $$\log_2(1 + D'_{T,i}\alpha_i) = \tilde{\beta}\log_2(1 + D_{T,i}\alpha_i) \quad (9)$$

$$1 + D'_{T,i}\alpha_i = (1 + D_{T,i}\alpha_i)^{\tilde{\beta}} < (1 + D_{T,i}\alpha_i) \text{ if } \tilde{\beta} \in (0, 1) \Rightarrow \quad (10)$$

$$D'_{T,i} = \frac{(1 + D_{T,i}\alpha_i)^{\tilde{\beta}} - 1}{\alpha_i} < D_{T,i} \quad (11)$$

We can do the same to demonstrate that we also have a lower transmit power. Starting from (11), and substituting $D'_{T,i} = P'_{T,i}/(B/\tilde{\beta})$ and $D_{T,i} = P_{T,i}/B$, we have $$P'_{T,i} = B \frac{\left(1 + \frac{P_{T,i}\alpha_i}{B}\right)^{\tilde{\beta}} - 1}{\alpha_i \tilde{\beta}} \stackrel{?}{<} P_{T,i} \quad (12)$$

The demonstration of a lower total transmit power can be obtained by starting from a substitution in (10) and demonstrating that $$f_2(P'_{T,i}) = 1 + KP'_{T,i} = f_1(P_{T,i}) = \left(1 + \frac{KP_{T,i}}{\tilde{\beta}}\right)^{\tilde{\beta}} < (1 + KP_{T,i}) = f_2(F_{T,i}), \quad (13)$$

where $P_{T,i} > 0$, $\tilde{\beta} \in (0, 1)$ and $K = \alpha_i/B > 0$. Consider that both $f_1$ and $f_2$ in (13) are continuous and derivable in $P_{T,i}$ and $\tilde{\beta} - 1 \in (-1, 0)$. Since we have that $f_1(P=0) = f_2(P=0) = 0$, it is sufficient to demonstrate that $$\frac{\partial f_1}{\partial P} < \frac{\partial f_2}{\partial P},$$

$\forall P \in (0, +\infty)$ to claim that $f_1(P) < f_2(P)$ in that interval, hence that $P'_{T,i} < P_{T,i}$. We have that $$\frac{\partial f_1}{\partial P} = \tilde{\beta}\left(1 + \frac{KP_{T,i}}{\tilde{\beta}}\right)^{\tilde{\beta}-1} \frac{K}{\tilde{\beta}} < K \quad (14)$$

$$k = \left(1 + \frac{KP_{T,i}}{\tilde{\beta}}\right)^{\tilde{\beta}-1} < 1$$

thus we only need to demonstrate that $$\frac{\partial f_2}{\partial P} = k,$$

Notice that (14) is true, since $KP_{T,i}/\tilde{\beta}>0$, thus $1+KP_{T,i}/\tilde{\beta}>1$, that is elevated to a term $\tilde{\beta}-1\in(-1, 0)$, producing a number $k\in(0, 1)\Rightarrow k<1$. We have finally demonstrated that $P'_{T,i}<P_{T,i}$ if $\beta\in(0, 1)$. Finally, we have proven the first FRA proposition when the method is applied with per-TTI allocations.

Proposition 1 With FRA we can perform per-TTI allocations, with the purpose to stretch the transmission over all available resource blocks in the TTI, without losing in reliability, delay and reducing the overall transmitted power spectral density and transmit power, hence interference, as shown in (11) and (12).

While the FRA concept developed with Assumption 1 brings the interesting gains summarized in Proposition 1, it may be even enhanced. Therefore, we formalize another assumption, that is not needed for FRA, but it allows a nice extension of the concept to a more interesting solution tailored especially for controlled environment, such as potentially the 6G subnetworks' case.

Assumption 2 The L2 has access to an estimate of the Smoothed Resource Utilization (SRU) $\beta'$, that is the ratio between the minimal required amount of resources—by the prior art L2 mechanisms—and the amount of available resources in the next TTIs.

The assumption 2 is not so strong as it may seem at a first glance, since all Semi-Persistent Scheduling (SPS) traffic is deterministic, like all previously registered Guaranteed Bit Rate (GBR) flows, whose channel is already averaged in our L2 product. Oscillating flows' average traffic can be somehow tracked (e.g. exponentially smoothed like done in proportional fair average rate) and congestion, i.e. full buffer, situations can be quickly detected. The proposal is to apply the FRA L2 procedure with $\beta=\min(\beta',1)$. Note that if $\beta'\geq1$, the network is congested and treated with prior art techniques. In this way, we would have a smoother, thus better, tracking of the real thirst for spectral efficiency of the system, trying to keep us on the edge of 100% utilization, matching delay and flow priorities as done in previous L2 concepts, since the system is still not congested, as shown in more more details in Section 3. As we saw, the more we are able to use all resources, the lower FRA $\beta$ we can use, the lower the transmit power and the interference in the system. Merging this FRA concept with (i) urgent traffic and (ii) sudden traffic burst is not critical and more details will be given in Subsection 4.2.

Proposition 2 With FRA we can perform per-TTI allocations if we know the Smoothed Resource Utilization (SRU) $\beta'$, with the purpose to stretch the scheduled transmissions to achieve an average 100% resource utilization, without losing in reliability, delay and reducing the overall transmitted power spectral density and transmit power, hence interference, as shown in (11) and (12).

Given its properties, FRA could make the co-existence of different cells of wireless networks much easier, since each system will reduce the interference to the others as much as possible without the need of controllers to arbitrate this behavior, achieving reduced transmit power, thus less interference, thus increasing throughput of congested cells if the cells close to it are not fully saturated.

3 Simulations

In this Section, we will illustrate our simulation results. The first subsection illustrates the deployment, while the second one contains and illustrates the numerical results.

3.1 Simulation Setup

The experiments are performed in a downlink system-level simulator which is 3GPP calibrated [TR38.802] and abstracts the physical-layer effects through a link to system-level interface. The interface employs an equivalent Signal-to-Interference-and-Noise Ratio (SINR), computed given the cell/user topology and active transmissions, with a vertically polarized antenna configuration.

TABLE 2

| Baseline simulation parameters | |
| --- | --- |
| General Environment | 3GPP 3D UMa [TR36.873], Inter Site Distance = 500 m |
| Number of 120° Cells | At the moment only 3, Wraparound interference |
| Simulation Time/Drops | 40 s |
| Number of Simulation Drops | 30 |
| FTP3 Users per Cell | 10 |
| FTP3 Packet Size | 1.6 Mbits |
| FTP3 Packet Size Timeout | 8 sec |
| Full Buffer (FB) Users in total | 1 |
| Interference Estimation | Data or Pilot based, ~100 ms averaging |
| CQI Model | Sub-band reports every 5 ms |
| CQI Table | CQI Table 1 [TS38.214] |
| Link Performance | LDPC for data transmission in [TS38.212, TS38.214] |
| Subcarrier Spacing | 15 kHz |
| Bandwidth | 10 MHz → 48 PRBs |
| SRU | 3 PRBs = 36 subcarriers → 16 SRUs |
| TTI | 1 ms |
| gNB Antennas | 2 Vertically polarized |
| User Antennas | 2 Vertically polarized |
| Spatial MUX | 1 or 2 layers SU-MIMO |
| Scheduler Metrics | Proportional Fair Scheduling |
| User Mobility | 3 km/h |
| Link to System-Level Model | MIESM [WAN et al., 2006] |

One should note the simple antenna configuration and the reduced number of cells. This is due to different reasons
1. At this first stage, we wanted to keep the overall simulation time short to observe first results. In particular, in order to observe a statistically relevant behavior with FTP3 users [TR36.872], we needed to run each simulation drop for many seconds. The current deployment already requires almost two days to execute a simulation campaign with 30 drops and 40 seconds drop duration.
2. We believe that the FRA concept is extremely interesting for 6G subnetworks, small wireless networks and/or scenarios like industry 4.0 where many access points will be present. In these cases, both low number of antennae at transmitter and receiver are expected. Still multi-layer SU-MIMO is implemented in the simulator.
3. In any case, simulations with higher number of antennae and cells may be run later.

The interference estimation (in terms of receive antenna covariance matrix) is performed either with pilots, that are always transmitted at full available power, or by observing real data transmission, thus knowing if there is an ongoing transmission or not and depending on the transmission power, that could be reduced with FRA LA. The traffic is mainly due to FTP3 users randomly deployed in the 3 cells, With varying packet inter-arrival time, we are able to tune the load offered in average in the system. Then, a full buffer user is placed in one of the three cells, allowing us to observe how FRA regulates transmit power for every simulation drop in "FTP3" only cells, where β is estimated in each cell based on algorithms described in Subsection 4.1, and the "FB" cell, where β will be equal to 1.00 due to the full buffer user with an infinite thirst for resources.

The analysis will focus mainly on the comparison of 6 cases

FRA 1.00—Data: FRA LA with β estimated with the offered traffic—see subsection 4.1, interference estimated during data transmission, FRA 1.00—Pilot: FRA LA with β estimated with the offered traffic, interference estimated with pilots transmitted always at full available power, FRA 0.80—Data: FRA LA with β estimated with the offered traffic and multiplying it by 0.80, interference estimated during data transmission, FRA 0.80—Pilot: FRA LA with β estimated with the offered traffic and multiplying it by 0.80, interference estimated with pilots transmitted always at full available power, ALA—Data: prior art ALA, interference estimated during data transmission, ALA—Pilot: prior art ALA, interference estimated with pilots transmitted always at full available power.

The idea of "FRA 0.80" is to further reduce MCS rate in every cell at every time, as we will observe in FIG. 1 the baseline FRA algorithm does not achieve full resource utilization. Of course, one could design better mechanisms to push the resource utilization closer to 100%, more discussion can be found in Subsection 4.1.

3.2 Simulation Results

FIG. 1 shows the average resource usage in cells with only FTP3 users. One can observe that resource usage with ALA in cells with only FTP3 users increase linearly until a point where cells start to be saturated (at around 15 Mbps average offered load). On the other hand, FRA (1.00) raises this resource usage closer to 100% utilization of the 10 MHz available carrier. The full allocation is not achieved mainly due to two reasons related to the finite CQI and MCS tables defined in [TS38.214]

Finite MCS table means that the selection of the downscaled MCS $m'_i$ will likely not be exact, i.e. $\alpha_{m'_i} \geq \beta\alpha_{m_i} > \alpha_{m'_i-1}$. As the previous inline equation suggests, we perform a conservative rate degradation, selecting the MCS $m'_i$, whose rate $\alpha_{m'_i}$ is equal or greater than the target rate $\beta\alpha_{m_i}$. This conservative rate degradation leads to a resource usage that would be clearly lower than the total capacity, even if the following point were not true.

In case some users are experiencing a bad channel, their ALA MCS rate $\alpha_{m_i}$ can be already low. If also β is low due to little offered traffic, the target rate could achieve values that are typically not considered in MCS tables. In these cases, we resort to the most conservative MCS allowed, that prevents lowering the flows' rate to the desired value and to achieve a full resource utilization.

More details on how to deal with these behaviors can be found in Subsection 4.1. Nevertheless, in this first simulation results we wanted to implement a rough baseline to push the resource usage towards 100%, that's the FRA with an overprovisioning parameter, that multiplies the computed β in every cell at every instance. As one can observe from FIG. 1, the resource usage is increased with this mechanism, of course not achieving 100%. One could also notice how estimating interference from Data transmission, brings benefits in term of being able to exploit all resources more often.

Figure 2:
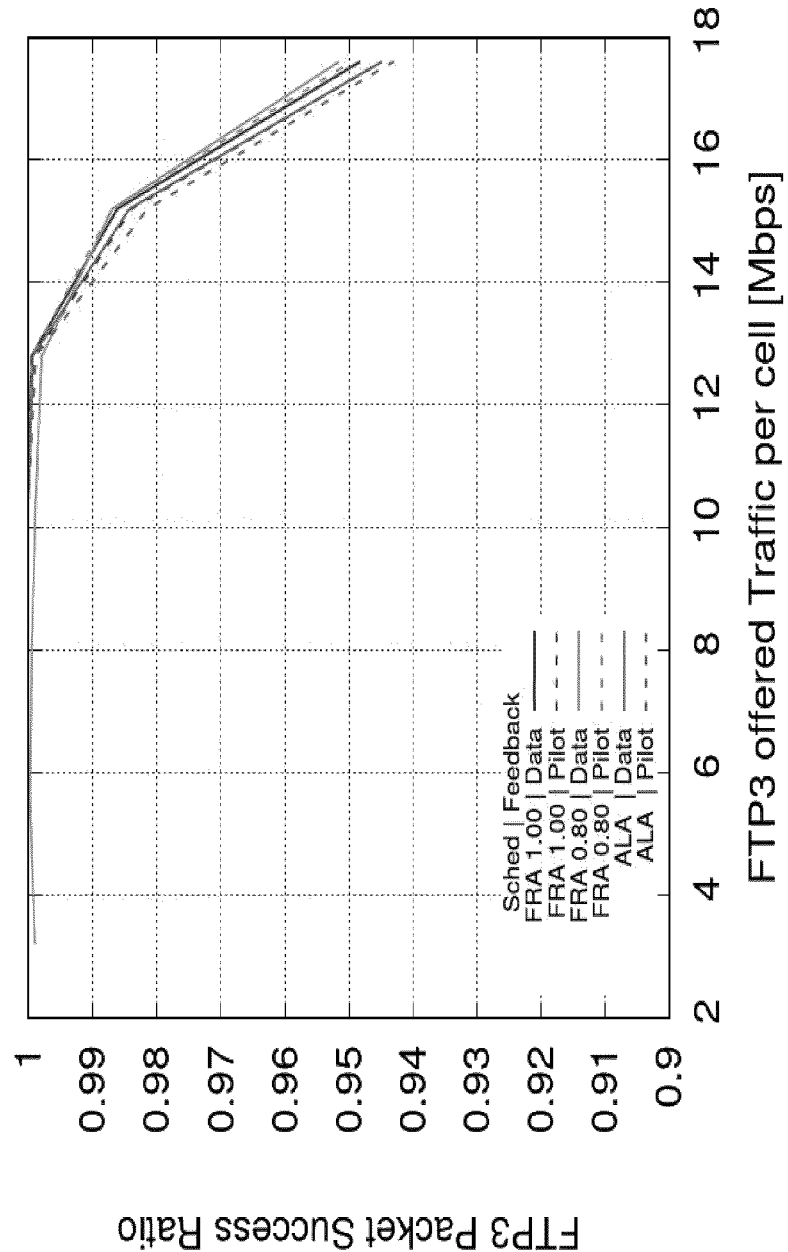
FIG. 2 shows FTP3 packet success ratio according to a simulation of an example embodiment of the invention.

FIG. 2 shows the FTP3 packet success ratio. One can observe from the percentage of FTP3 packets successfully transmitted plot in FIG. 2 that, even this overprovisioning method is not optimal, we are still able to carry all packets that we could carry with ALA, both with FRA 1.00 and FRA 0.80. We can still appreciate a small gain of FRA, already starting to demonstrate minor gains for FTP3 at cell capacity. One could also check the performance with lower overprovisioning factors, expecting some losses when it becomes too low.

Figure 3:
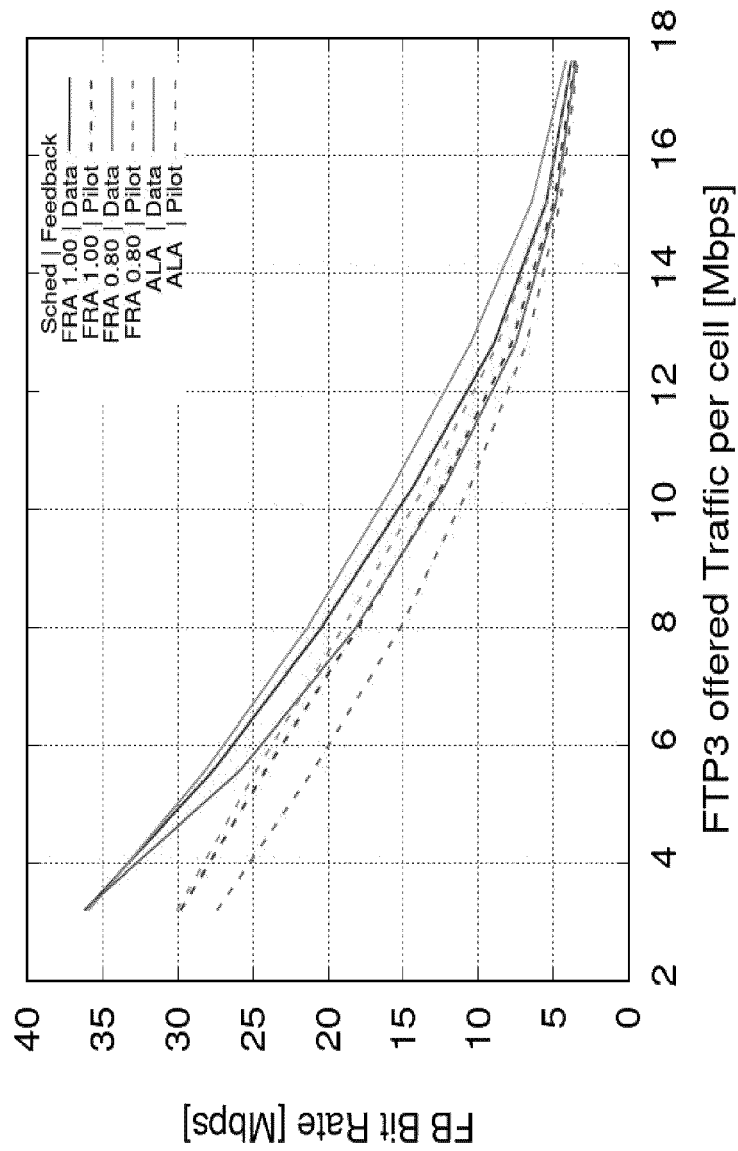
FIG. 3 shows throughputs according to a simulation of an example embodiment of the invention.
Figure 4:
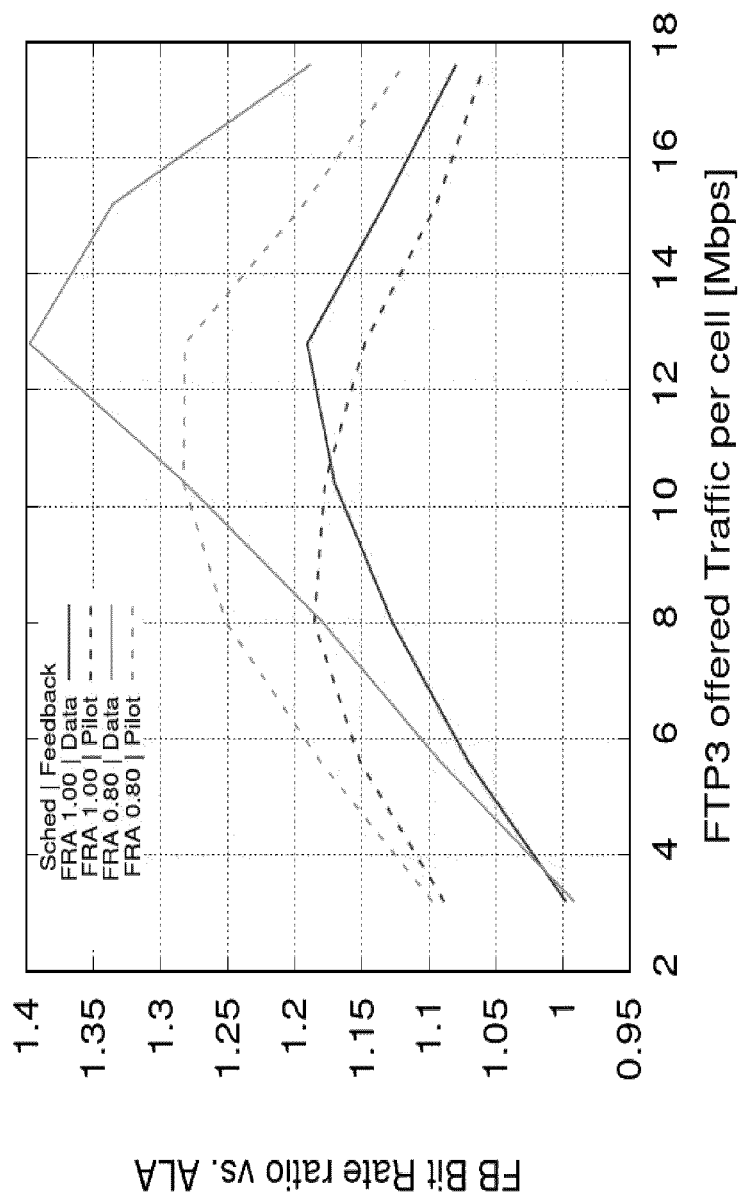
FIG. 4 shows a ratio of throughputs according to a simulation of an example embodiment of the invention.

After checking that FRA is not losing in terms of finite buffer transmissions performance, we have finally reached the point where the major numerical benefits of FRA could be assessed. The whole purpose of having FRA is to obtain a self-regulated interference power reduction in the system, allowing the non saturated cells to operate without loss of capacity and the saturated cells to boost their performance. FIG. 3 and FIG. 4 show, respectively, the throughput experienced by the unique full buffer user in the system and the ratio of throughput experienced by the unique full buffer user in the system with FRA 1.00 and FRA 0.80 versus the throughput experienced with ALA. As it can be expected, when FTP3 load is minimal or approaching congestion, the performance of ALA and FRA shown in FIG. 3 become closer and closer. Still, some gains are observed with Pilot-based interference estimation at low loads. Then, in all other non congested load cases, FRA approaches are able to push the full buffer throughput (corresponding to the residual cell capacity) up to about 19% gains with FRA 1.00 and 40% with FRA 0.80, as plot in FIG. 4. The inventors expect even higher gains with lower inter-site distances and more traffic fluctuations.

Figure 5B:
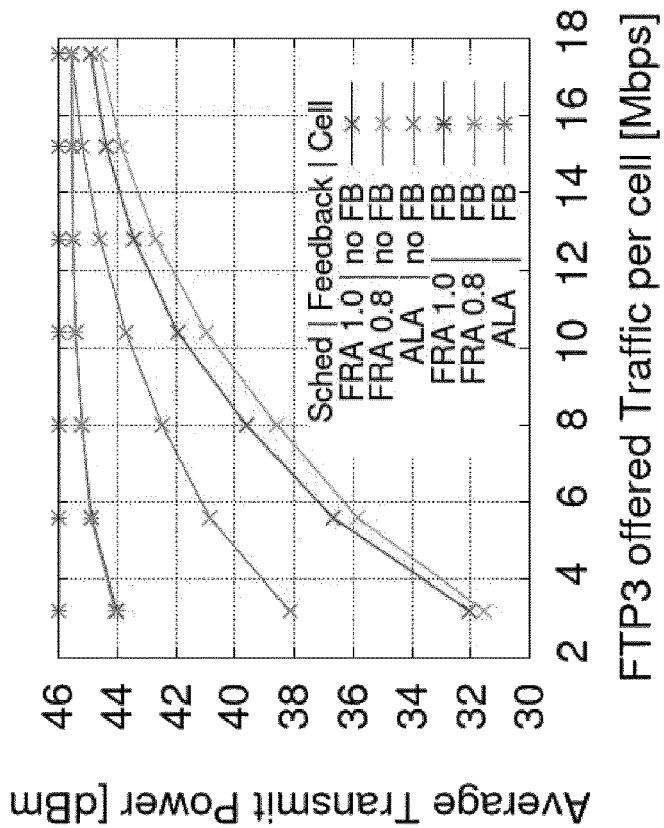
FIG. 5 shows transmit powers according to a simulation of an example embodiment of the invention.
Figure 5A:
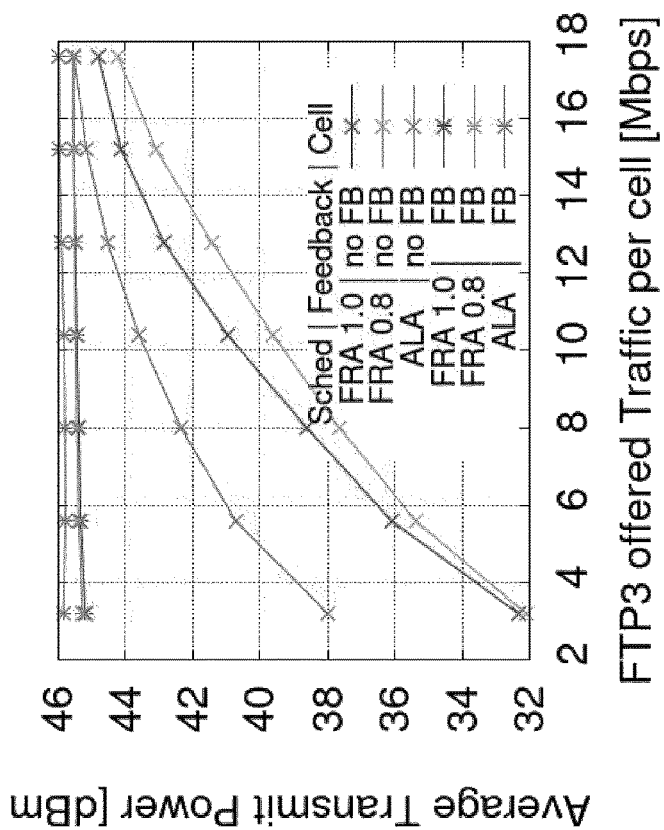

FIG. 5 shows the transmit power with different LA algorithms. The cells with full buffer user are marked as "FB" with stars, while cells with FTP3 traffic only are marked as "no FB" with crosses. In particular, FIG. 5a shows results with data-based feedback, while FIG. 5b with pilot-based feedback. The plots in FIG. 5a, 5b show the other main benefit of FRA, specifically in term of reduced transmit power. In FIG. 5a, 5b we plot the average transmit power in both the fully saturated cells and the FTP3 only cells. In this case, the best gains are of course observed with low FTP3 offered traffic, allowing to achieve around 6 dB power reduction with roughly 15% of the cell capacity. We can observe also a minor power reduction in the fully saturated cells. This is due to the full 46 dBm transmit power being used with ALA, while FRA still reduces the transmit power with the most aggressive MCS (we have always β=1 with fully loaded cells) to match the target BLER. Since the MCS table is discrete, we observed an almost 1 dB average transmit power reduction in cells with FB traffic.

4 Other Features

This section contains additional features and/or considerations related to FRA.

1. More details on how to track required resources and modify β to achieve full resource utilization.
2. Some comment on scheduling hard priority and delay critical services with FRA.
3. Additional signaling needed in the UL scheduling grants (e.g. DCI 0) for applying FRA in UL.

4.1 Tracking and Modifying FRA β Parameter

The FRA parameter β must reflect the resource usage that is expected to be experienced in the following TTIs. In order to describe our proposal, we need to introduce the concept of time-smoothing average, that is a generic technique to average the last realizations of a process in time, slowly forgetting the past. A possible implementation is what we call exponential smoothing where the a generic discrete-time process $g_n$ sampled at time $T_n$ is averaged by the time "smoothed" process $\gamma(\bullet)$ as follows $$\gamma(T_n) = \alpha^{T_n - T_{n-1}} \cdot \gamma(T_{n-1}) + (1 - \alpha^{T_n - T_{n-1}}) g_n, \text{ where} \quad (15)$$

$T_{n-1}$ is the last update time,
$\alpha \in [0, 1)$ is the memory in a unit of time. If $\alpha = 0$, there is no smoothing at all.

One can initialize the process by setting $T_0 = -\infty$.

As baseline algorithm, we propose to keep track of the exponential smoothing of the net aggressive spectral efficiency $\eta_i$ and the offered traffic $\gamma_i$ for each user $i \in I_c$ active in the cell c. In our simulator, we update $\gamma_i$ with zeros for every subframe without packet arrivals and with the packet size divided by last update elapsed time for a packet arrival, while $\eta_i$ is updated at every CQI feedback, measuring the reported achievable MCS rate and multiplying it by the target packet success probability. If no estimates are available yet, one can simply take some default values, like the historic average of the cell users. This allows to estimate the amount of "offered" resources with ALA at each scheduler, as $$\hat{\beta} = \min \left[ \sum_{i \in I_c} \frac{\gamma_i}{\eta_i N}, 1 \right] \quad (16)$$

where N is the number of resource elements available per TTI—a normalization factor. Moreover, the presence of a FB traffic flow in our simulator is sufficient to cap $\beta$ to 1.

Further discussion points

- As we saw in Section 3, we suggest to further lower the estimated $\beta$ by multiplying it with a constant term $\delta$ in every cell at every time. This is an initial bad heuristic to assess further potential FRA gains.
- An adaptive algorithm running in every cell $c \in C$ could tune its own $\delta_c$ in an adaptive way. An initial idea could be to increase it if the smoothed/instantaneous resource usage $R_c$ is 100%, and reduce it if it is lower. The reduction amount could be proportional to $(1 - R_c)$.
- As discussed in Section 3, the rate of flows with a bad channel could not be reduced a lot due to the smallest MCS rate. One can think to re-distribute the reduction to higher rate flows as an alternative solution to the suggested techniques above.

4.2 Scheduling Hard Priority and Delay Critical Services

This short Subsection is to suggest some small, but useful, modifications to FRA allowing it to deal with hard priority and low latency flows. In case of hard priority the sorting is demanded to the scheduling metrics, thus the mere priority part is not impacted by FRA at all. Everything boils down to enforcing delay critical targets, if present. Two methods are presented, one with extremely simple implementation, the other more complex, but with likely better results.

One simple, but efficient way to allow FRA and delay critical co-existence, is to simply use ALA for these flows and re-compute $\beta$ for other services accordingly. If $I'_c \subseteq I_c$ is the subset of delay critical services in the cell c, one can assign ALA $\forall i \in I'_c$ and substitute the general FRA $\beta$ equation (16) with the following $$\hat{\beta} = \min \left[ \frac{\sum_{i \in I_c \setminus I'_c} \frac{\gamma_i}{\eta_i N}}{1 - \sum_{i \in I'_c} \frac{\gamma_i}{\eta_i N}}, 1 \right] \quad (17)$$

Another option could be to track $\beta$ as suggested in (16). If a URLLC flows appears, one can compute how many Physical Resource Blocks (PRBs) $p_N$ and TTIs t are needed to allocate them. Then, one could apply FRA also to URLLC, using $\beta_{URLLC}$ defined as $$\beta_{URLLC} = \max \left[ \beta, \frac{p_n}{t \cdot p_T} \right] \quad (18)$$

where $p_T$ is the number of PRBs in a TTI. At the end, the idea is to stretch URLLC without exceeding the number of TTIs needed, if allowed (if $\beta$ is sufficiently low).

Another variant of the point above is to choose a $\beta_{URLLC}$ such that one the URLLC service could be allocated within a given delay target, instead that within the number of TTIs needed with ALA. This would allow the usage of a lower $\beta_{URLLC}$ than the variant described above.

4.3 Additional Signaling Needed in RAT Standards, Focusing on the UL Scheduling Grants (e.g. DCI 0)

While FRA could be run in DL without need of additional changes in wireless standards, since the down-scaled MCS and reduced transmit power are computed and used for transmission at the base station side as a DU functionality. One may want to signal to the RU that the scheduled symbols are with reduced power, to maybe adapt amplifiers working range and save additional power.

However, while the down-scaled MCS could be easily communicated with existing signaling, FRA in UL requires additional information to be communicated in the scheduling grants, e.g. DCI 0 in New Radio [TS38.212], namely the reduced transmit power to be used for the allocated transmission. This message can assume the form of a new field in the scheduling grants, e.g. DCI 0 in New Radio, and be conveyed in one of the following ways

- Absolute transmit power, e.g. in dBW or dBm or any unity of measure.
- Power ratio compared to the allowed total transmit power or the transmit power allowed by the open loop power control mechanism. For instance, $-3$ dB means to halve the transmit power.
- The same signaling described in the points above, but related to power spectral density values.

An alternative to adopt the algorithm in UL without impacting the DCI, could be to signal a "conservative power reduction" information (the power will be reduced less) through the same mechanisms carrying power control information or through RRC periodic signaling.

BIBLIOGRAPHY

[BMA2020] G. Berardinelli, P. Mogensen, and R. O. Adeogun, "6G subnetworks for Life-Critical Communication," 2nd 6G Wireless Summit (6G SUMMIT), 2020.

[ADEOGUN2020] R. Adeogun, G. Berardinelli, P. E. Mogensen, I. Rodriguez and M. Razzaghpour, "Towards 6G in-X Subnetworks With Sub-Millisecond Communication Cycles and Extreme Reliability," in IEEE Access, vol. 8, pp. 110172-110188, 2020, doi: 10.1109/ACCESS.2020.3001625.

[PAKJ2019] Park, S., Agiwal, M., Kwon, H., & Jin, H. (2019). "An evaluation methodology for spectrum usage in LTE-A networks: Traffic volume and resource utilization perspective." IEEE Access, 7, 67863-67873.

[PPM18] G. Pocovi, K. I. Pedersen, and P. Mogensen, "Joint link adaptation and scheduling for 5G ultra-reliable low-latency communications," IEEE Access, vol. 6, pp. 28 912-28 922, 2018.

[U.S. Pat. No. 6,167,031] Ericsson, "Method for selecting a combination of modulation and channel coding schemes in a digital communication system", U.S. Pat. No. 6,167, 031.

[2007104149] Samsung, "Method and system for providing adaptive modulation and coding in a multi-carrier wireless network", US2007104149.

[KM19] S. Klein and S. Mandelli, "Link adaptation in telecommunication systems," 2019, filed patent application.

[BMP20] A. Brighente, J. Mohammadi, and P. Baracca, "Interference distribution prediction for link adaptation in ultra-reliable low-latency communications," in Proc. IEEE Vehicular Technology Conference (VTC-Spring), Antwerp (Belgium), May 2020.

[Polyanskiy et al., 2010] Y. Polyanskiy, H. V. Poor and S. Verdu, "Channel Coding Rate in the Finite Blocklength Regime," in IEEE Transactions on Information Theory, vol. 56, no. 5, pp. 2307-2359, May 2010, doi: 10.1109/TIT.2010.2043769.

[Shannon, 1948] Shannon, Claude E. "A mathematical theory of communication." Bell system technical journal 27.3 (1948): 379-423.

[Mandelli et al., 2019] S. Mandelli, M. Andrews, S. Borst and S. Klein, "Satisfying Network Slicing Constraints via 5G MAC Scheduling," IEEE INFOCOM 2019—IEEE Conference on Computer Communications, Paris, France, 2019, pp. 2332-2340, doi: 10.1109/INFOCOM.2019.8737604.

[TR38.802] 3GPP (2020). TR 38.802: Study on new radio access technology. Physical layer aspects.

[TS38.212] 3GPP (2020). TS 38.212: Channel Coding and Multiplexing.

[TS38.214] 3GPP (2020). TS 38.214: NR Physical layer procedures for data.

[TR36.872] 3GPP (2013). TR 36.872: Small cell enhancements for E-UTRA and E-UTRAN—Physical layer aspects.

[TR36.873] 3GPP (2020). TR 36.873: Study on 3D channel model for LTE.

[WAN et al., 2006] L. Wan, S. Tsai, M. Almgren (2006). "A fading-insensitive performance metric for a unified link quality model." In: *Proc. IEEE WCNC* 2006, 2110-2114.

The invention claimed is:

1. Apparatus comprising:
one or more processors, and
at least one memory storing instructions that, when executed with the one or more processors, cause the apparatus to perform:
determining, for at least one of plural terminals, a respective first amount of resources with a respective first power and a respective non-aggressive modulation and coding scheme such that a respective target value is guaranteed for a respective block error rate of a transmission from a base station to a respective terminal under a respective assumed channel estimate of a channel from the base station to the respective terminal and a respective assumed signal to interference and noise ratio estimate on the channel; and
instructing a transmission device to perform, to the at least one of the plural terminals, the transmission to the respective terminal using the respective non-aggressive modulation and coding scheme on the respective first amount of the resources with the respective first power,
wherein for the plural terminals, the transmission device performs hypothetically the transmission to the respective terminal using a respective aggressive modulation and coding scheme on a respective second amount of the resources with a respective maximum available power such that the respective target value is guaranteed for the respective block error rate of the transmission to the respective terminal under the respective assumed channel estimate and the respective assumed signal to interference and noise ratio estimate;
wherein for the at least one of the plural terminals, the respective first amount of the resources is larger than the respective second amount of the resources, and
wherein for the at least one of the plural terminals, for at least a respective one of the resources of the respective first amount of the resources, the respective first power is less than the respective maximum available power of the respective resource.

2. The apparatus according to claim 1, wherein the instructions, when executed with the one or more processors, further cause the apparatus to perform:
determining, for the plural terminals, a respective first amount of resources with a respective first power and a respective non-aggressive modulation and coding scheme such that a respective target value is guaranteed for a respective block error rate of a transmission from the base station to the respective terminal under a respective assumed channel estimate of a channel from the base station to the respective terminal and a respective assumed signal to interference and noise ratio estimate on the channel; and
instructing a transmission device to perform, to the plural terminals, the transmission to the respective terminal using the respective non-aggressive modulation and coding scheme on the respective first amount of the resources with the respective first power,
wherein for the plural terminals, the respective first amount of the resources is larger than the respective second amount of the resources,
wherein for the plural terminals, for at least a respective one of the resources of the respective first amount of the resources, the respective first power is less than the respective maximum available power of the respective resource.

3. The apparatus according to claim 1, wherein the instructions, when executed with the one or more processors, further cause the apparatus to perform:
determining, for the plural terminals, the respective second amount of the resources with the respective maximum available power and a respective aggressive modulation and coding scheme such that the respective target value is guaranteed for the respective block error rate of the transmission from the base station to the respective terminal under the respective assumed channel estimate of the channel from the base station to the respective terminal and the respective assumed signal to interference and noise ratio estimate on the channel;
checking whether a total amount of the resources available for transmissions to the plural terminals is larger than a sum of the second amounts of the resources for the plural terminals; and
based upon the total amount of the resources is not larger than the sum of the second amounts of the resources:
instructing the transmission device to perform, to at least a subset of the plural terminals, the transmission to the respective terminal using the respective aggressive modulation and coding scheme on the respective second amount of the resources with the respective maximum available power.

4. The apparatus according to claim 3, wherein the instructions, when executed with the one or more processors, further cause the apparatus to:
based upon the total amount of the resources is not larger than the sum of the second amounts of the resources:
inhibiting, for the at least one of plural terminals, the determining of the respective first amount of the resources with the respective first power and the respective non-aggressive modulation and coding scheme.

5. The apparatus according to claim 3, wherein:
a first modulation and coding scheme is the respective non-aggressive modulation and coding scheme;
a second modulation and coding scheme is the respective aggressive modulation and coding scheme; and
a ratio of a rate achievable by the first modulation and coding scheme and a rate achievable by the second modulation and coding scheme is fixed.

6. The apparatus according to claim 1, wherein the instructions, when executed with the one or more processors, further cause the apparatus to perform:
repeatedly, once for every transmission time interval, determining, for the at least one of plural terminals, the respective first amount of resources with the respective first power and the respective non-aggressive modulation and coding scheme; and
repeatedly, once for every transmission time interval, instructing the transmission device to perform, to the at least one of the plural terminals, the transmission to the respective terminal using the respective non-aggressive modulation and coding scheme on the respective first amount of the resources with the respective first power,
wherein a time average of a total transmit power of transmissions to the plural terminals over plural transmission time intervals is lower than a hypothetical time average of a total transmit power that were transmitted based upon the transmission device performed the transmissions to the plural terminals using the respective aggressive modulation and coding scheme on the respective second amount of the resources with the respective maximum available power.

7. The apparatus according to claim 1, wherein the instructions, when executed with the one or more processors, further cause the apparatus to perform, for the plural terminals:
checking whether the transmission to the respective terminal is delay-critical; and
instructing the transmission device to perform the transmission to the respective terminal using the respective aggressive modulation and coding scheme on the respective second amount of the resources with the respective maximum available power based upon the transmission to the respective terminal is delay critical.

8. A method comprising:
determining, for at least one of plural terminals, a respective first amount of resources with a respective first power and a respective non-aggressive modulation and coding scheme such that a respective target value is guaranteed for a respective block error rate of a transmission from a base station to a respective terminal under a respective assumed channel estimate of a channel from the base station to the respective terminal and a respective assumed signal to interference and noise ratio estimate on the channel; and
instructing a transmission device to perform, to the at least one of the plural terminals, the transmission to the respective terminal using the respective non-aggressive modulation and coding scheme on the respective first amount of the resources with the respective first power,
wherein for the plural terminals, the transmission device perform hypothetically the transmission to the respective terminal using a respective aggressive modulation and coding scheme on a respective second amount of the resources with a respective maximum available power such that the respective target value is guaranteed for the respective block error rate of the transmission to the respective terminal under the respective assumed channel estimate and the respective assumed signal to interference and noise ratio estimate;
wherein for the at least one of the plural terminals, the respective first amount of the resources is larger than the respective second amount of the resources, and
wherein for the at least one of the plural terminals, for at least a respective one of the resources of the respective first amount of the resources, the respective first power is less than the respective maximum available power of the respective resource.

9. The method according to claim 8, further comprising:
determining, for the plural terminals, a respective first amount of resources with a respective first power and a respective non-aggressive modulation and coding scheme such that a respective target value is guaranteed for a respective block error rate of a transmission from the base station to the respective terminal under a respective assumed channel estimate of a channel from the base station to the respective terminal and a respective assumed signal to interference and noise ratio estimate on the channel; and
instructing a transmission device to perform, to the plural terminals, the transmission to the respective terminal using the respective non-aggressive modulation and coding scheme on the respective first amount of the resources with the respective first power,
wherein for the plural terminals, the respective first amount of the resources is larger than the respective second amount of the resources,
wherein for the plural terminals, for at least a respective one of the resources of the respective first amount of the resources, the respective first power is less than the respective maximum available power of the respective resource.

10. The method according to claim 8, further comprising:
determining, for the plural terminals, the respective second amount of the resources with the respective maximum available power and a respective aggressive modulation and coding scheme such that the respective target value is guaranteed for the respective block error rate of the transmission from the base station to the respective terminal under the respective assumed channel estimate of the channel from the base station to the respective terminal and the respective assumed signal to interference and noise ratio estimate on the channel;
checking whether a total amount of the resources available for transmissions to the plural terminals is larger than a sum of second amounts of the resources for the plural terminals; and
based upon the total amount of the resources is not larger than the sum of the second amounts of the resources:

instructing the transmission device to perform, to at least a subset of the plural terminals, the transmission to the respective terminal using the respective aggressive modulation and coding scheme on the respective second amount of the resources with the respective maximum available power.

11. The method according to claim 10, further comprising:
based upon the total amount of the resources is not larger than the sum of the second amounts of the resources:
inhibiting, for the at least one of plural terminals, the determining of the respective first amount of the resources with the respective first power and the respective non-aggressive modulation and coding scheme.

12. The method according to claim 10, wherein:
a first modulation and coding scheme is the respective non-aggressive modulation and coding scheme;
a second modulation and coding scheme is the respective aggressive modulation and coding scheme; and
a ratio of a rate achievable by the first modulation and coding scheme and a rate achievable by the second modulation and coding scheme is fixed.

13. The method according to claim 8, further comprising:
repeatedly, once for every transmission time interval, determining, for the at least one of plural terminals, the respective first amount of resources with the respective first power and the respective non-aggressive modulation and coding scheme; and
repeatedly, once for every transmission time interval, instructing the transmission device to perform, to the at least one of the plural terminals, the transmission to the respective terminal using the respective non-aggressive modulation and coding scheme on the respective first amount of the resources with the respective first power,
wherein a time average of a total transmit power of the transmissions to the plural terminals over plural transmission time intervals is lower than a hypothetical time average of a total transmit power that were transmitted based upon the transmission device performed the transmissions to the plural terminals using the respective aggressive modulation and coding scheme on the respective second amount of the resources with the respective maximum available power.

14. The method according to claim 8, further comprising:
checking whether the transmission to the respective terminal is delay-critical; and
instructing the transmission device to perform the transmission to the respective terminal using the respective aggressive modulation and coding scheme on the respective second amount of the resources with the respective maximum available power based upon the transmission to the respective terminal is delay critical.

\* \* \* \* \*